US009319551B2

(12) United States Patent
Kobayashi et al.

(10) Patent No.: US 9,319,551 B2
(45) Date of Patent: Apr. 19, 2016

(54) IMAGE FORMING APPARATUS IN WHICH INITIALIZATION OPERATION IS PERFORMED BASED ON STORED DEGENERACY INFORMATION

(71) Applicant: CANON KABUSHIKI KAISHA, Tokyo (JP)

(72) Inventors: Hiroyuki Kobayashi, Kawasaki (JP); Akinori Takeo, Yokohama (JP); Aya Kasahara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/095,868

(22) Filed: Dec. 3, 2013

(65) Prior Publication Data

US 2014/0176975 A1     Jun. 26, 2014

(30) Foreign Application Priority Data

Dec. 25, 2012  (JP) .................................. 2012-281757

(51) Int. Cl.
  *H04N 1/00*      (2006.01)
  *G06K 15/00*    (2006.01)
  *G03G 15/00*    (2006.01)

(52) U.S. Cl.
  CPC ....... *H04N 1/00888* (2013.01); *G03G 15/5004* (2013.01); *G06K 15/4055* (2013.01); *H04N 1/00278* (2013.01)

(58) Field of Classification Search
  USPC .......... 358/1.13, 1.14, 1.15, 1.16; 710/19, 20; 714/24; 713/300; 399/75
  See application file for complete search history.

(56) References Cited

U.S. PATENT DOCUMENTS

| 5,153,829 | A | 10/1992 | Furuya et al. |
| 5,845,137 | A | 12/1998 | Tanaka |
| 6,895,196 | B2* | 5/2005 | Uchizono et al. ............... 399/75 |
| 7,428,391 | B2 | 9/2008 | Kobayashi |
| 8,578,181 | B2* | 11/2013 | Tanaka .......................... 713/300 |
| 9,172,840 | B2* | 10/2015 | Osada ................. G06F 11/0793 |

(Continued)

FOREIGN PATENT DOCUMENTS

| CN | 1892470 A | 1/2007 |
| CN | 1946142 A | 4/2007 |

(Continued)

OTHER PUBLICATIONS

Chinese Office Action dated Feb. 5, 2016 issued in corresponding Chinese Patent Application No. 201310717458.4.

(Continued)

*Primary Examiner* — Allen H Nguyen
(74) *Attorney, Agent, or Firm* — Fitzpatrick, Cella, Harper & Scinto

(57) ABSTRACT

An image forming apparatus, and a method of controlling it. The apparatus performs, in a case where at least one function out of a plurality of functions of the apparatus ceases to be usable, degeneracy control for operating to provide functions other than the at least one function, and stores information indicating a degeneracy control state is entered. The apparatus controls so as to activate without initialization operation of an image forming mechanism in a case where it is determined that the activation is due to the return from a power saving mode and the information is stored and so as to activate with the initialization operation when the activation is due to a power of the apparatus being turned on.

9 Claims, 11 Drawing Sheets

(56) References Cited

U.S. PATENT DOCUMENTS

| | | | |
|---|---|---|---|
| 2009/0327808 A1* | 12/2009 | Takizawa | 714/24 |
| 2010/0166448 A1 | 7/2010 | Mikami | |
| 2011/0299109 A1* | 12/2011 | Kamisuwa | H04N 1/00244 358/1.14 |
| 2012/0089243 A1 | 4/2012 | Kobayashi | |
| 2012/0262751 A1 | 10/2012 | Inaba et al. | |
| 2013/0057883 A1* | 3/2013 | Ohshima et al. | 358/1.9 |
| 2014/0016007 A1 | 1/2014 | Ogura et al. | |

FOREIGN PATENT DOCUMENTS

| | | |
|---|---|---|
| CN | 102739902 A | 10/2012 |
| CN | 102795003 A | 11/2012 |
| JP | 2000-196789 A | 7/2000 |
| JP | 2002-320066 A | 10/2002 |
| JP | 2003-241582 A | 8/2003 |
| JP | 2005-265932 A | 9/2005 |
| JP | 2006-259591 A | 9/2006 |
| JP | 2010-8742 A | 1/2010 |

OTHER PUBLICATIONS

Korean Office Action dated Jan. 12, 2016 issued in corresponding Korean Patent Application No. 10-2013-0156877.

* cited by examiner

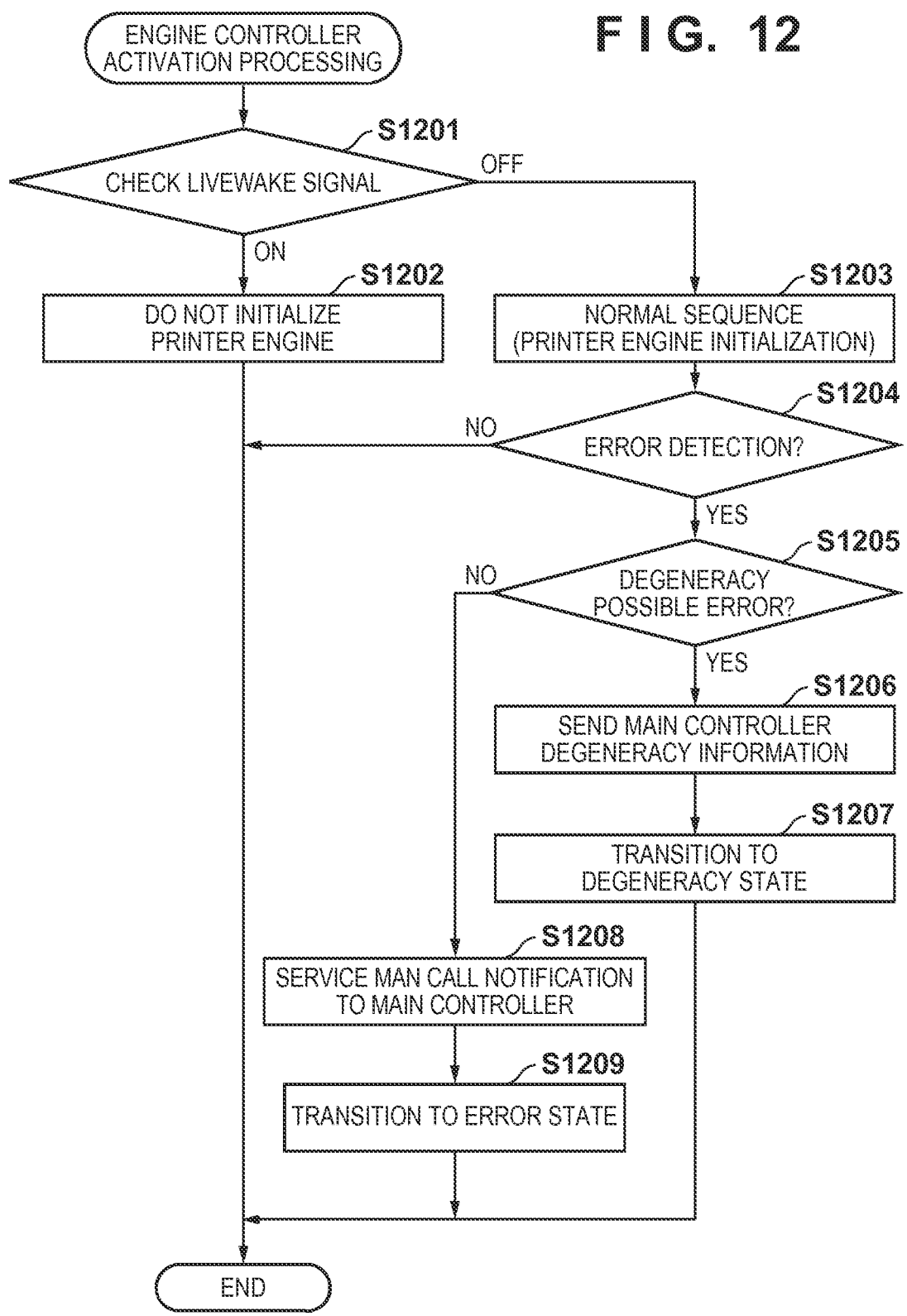

IMAGE FORMING APPARATUS IN WHICH INITIALIZATION OPERATION IS PERFORMED BASED ON STORED DEGENERACY INFORMATION

BACKGROUND OF THE INVENTION

1. Field of the Invention

The present invention relates to an image forming apparatus, a method of controlling the same, and a storage medium.

2. Description of the Related Art

There exists known degeneracy control for operating to provide only the functions that can be realized without using troubled parts, in a case where one or more parts are troubled in an image forming apparatus having various functions such as printing, scanning, and faxing, as opposed to all of the functions of the image forming apparatus becoming unusable. Such degeneracy control is recited in Japanese Patent Laid-Open No. 2002-320066 for example. Specifically, the image forming apparatus detects troubles upon power activation of each engine (for example a printer engine or a scanner engine), and in cases where it further determines that the trouble is such that the degeneracy control is possible, it transitions to the degeneracy control. A return to a normal state from the degeneracy control is performed when power of the apparatus is once again activated after a serviceman has changed the troubled part.

Also, in recent years, power saving in image forming apparatuses has received attention and image forming apparatuses with a built-in power saving mode that aims to improve power saving in the image forming apparatus have become commercially available. This kind of image forming apparatus power saving mode suppresses electric power consumption by stopping electric power supply to the printer engine and the scanner engine when they are not being used; electric power supply is only initiated to the necessary engine unit at a timing at which the user uses the corresponding function. For example, when a print instruction is received while the image forming apparatus is in the power saving mode and power is not being supplied to the printer engine, electric power supply to the printer engine is resumed. Here, after the printer engine is initialized (calibration), printing is executed in accordance with the print instruction.

However, if, hypothetically, the electric power supply to the printer engine is always resumed and the printer engine is always initialized when the print instruction is received during the power saving mode as described above, the following problem occurs. For example, even in a case where a trouble occurred in a part of the printer engine before transitioning to the power saving mode and the degeneracy control was being performed, the electric power supply to the printer engine is resumed upon the print instruction, and printer engine initiation initialization (calibration) is executed. Because of this there is the possibility that the trouble in the printer engine is worsened.

SUMMARY OF THE INVENTION

An aspect of the present invention is to eliminate the above-mentioned problems with the conventional techniques.

A feature of the present invention is to provide a technique in which a worsening of a state of trouble in an engine is prevented by not executing engine (image forming mechanism) initialization processing in a case where an apparatus is activated in a power saving mode in a state where degeneracy control is being executed.

According to an aspect of the present invention, there is provided an image forming apparatus, comprising: an image forming unit configured to form an image on a sheet; a control unit configured to control operation of the image forming unit; and a storage unit configured to store information indicating that a function of the image forming unit is restricted. The control unit: (A) does not execute an initialization operation of the image forming unit in a case where the storage unit stores the information and the image forming apparatus activates from a power saving state in which an electric power supply to the control unit is stopped, and (B) does execute the initialization operation of the image forming unit in a case where the storage unit does not store the information and the image forming apparatus activates from the power saving state.

According to another aspect of the present invention, there is provided an image forming apparatus having an engine, an engine controller for controlling the engine, and a main controller capable of communicating with the engine controller. The main controller is configured to output an activation instruction to the engine controller in accordance with an activation of the image forming apparatus. The engine controller comprises: a determination unit configured to determine, in accordance with the activation instruction, whether or not degeneracy control was performed prior to the activation; a first activation unit configured to determine, in a case where the determination unit determined that degeneracy control was performed, whether or not the activation is due to a return from a power saving mode, and configured to activate, prohibiting initialization processing of the engine, in a case where the activation is due to the return from the power saving mode; and a second activation unit configured to activate, executing the initialization processing of the engine in a case where the determination unit determined that the degeneracy control was not performed or in a case where the activation is not due to the return from the power saving mode.

According to another aspect of the present invention, there is provided an image forming apparatus having an engine, an engine controller for controlling the engine, and a main controller capable of communicating with the engine controller. The main controller comprises: a determination unit configured to determine, in accordance with an activation of the image forming apparatus, whether or not degeneracy control was performed prior to the activation; a first activation unit configured to activate the image forming apparatus, prohibiting initialization processing of the engine, in a case where the determination unit determined the degeneracy control was performed; and a second activation unit configured to activate the engine controller and the engine in a case where the determination unit determined that the degeneracy control was not performed.

According to another aspect of the present invention, there is provided an image forming apparatus having an engine, an engine controller for controlling the engine, and a main controller capable of communicating with the engine controller. The main controller comprises: a storage unit configured to store degeneracy information from the engine controller; a power saving unit configured to transition, in a case where a condition of a power saving mode is satisfied, to the power saving mode; a control unit configured to output, to the engine controller, when the degeneracy information is stored in the storage unit upon transition to the power saving mode by the power saving unit, a control signal for controlling so that, upon return from the power saving mode, initialization processing of the engine is not performed; and an activation unit configured to make an instruction so as to activate the engine controller upon return from the power saving mode. The engine controller comprises: an activation control unit configured to initiate an activation in accordance with the instruction of the activation unit, and further configured to activate, prohibiting, or not prohibiting, initialization processing of the engine in accordance with the control signal.

According to another aspect of the present invention, there is provided an image forming apparatus having a power saving mode, comprising: a degeneracy control unit configured to perform, in a case where at least one function out of a plurality of functions of the image forming apparatus ceases to be usable, degeneracy control for operating to provide functions of the plurality of functions other than the at least one function; a storage unit configured to store information indicating that a degeneracy control state in which the degeneracy control is performed by the degeneracy control unit is entered; a determination unit configured to determine, when instructed of an activation of the image forming apparatus, whether the activation is due to a return from a power saving mode or whether the activation is due to an electric power source of the image forming apparatus being turned on; and an activation control unit configured to control so as to activate without performing an initialization operation of an image forming mechanism in a case where the determination unit determines that the activation is due to the return from the power saving mode and the storage unit stores the information, and so as to execute the activation along with the initialization operation of the image forming mechanism in a case where the determination unit determines that the activation is due to an electric power source of the image forming apparatus being turned on.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a flowchart for describing processing in a case where the engine controller of the image forming apparatus according to the third embodiment returns from the power saving mode.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

[First Embodiment]

Figure 1:
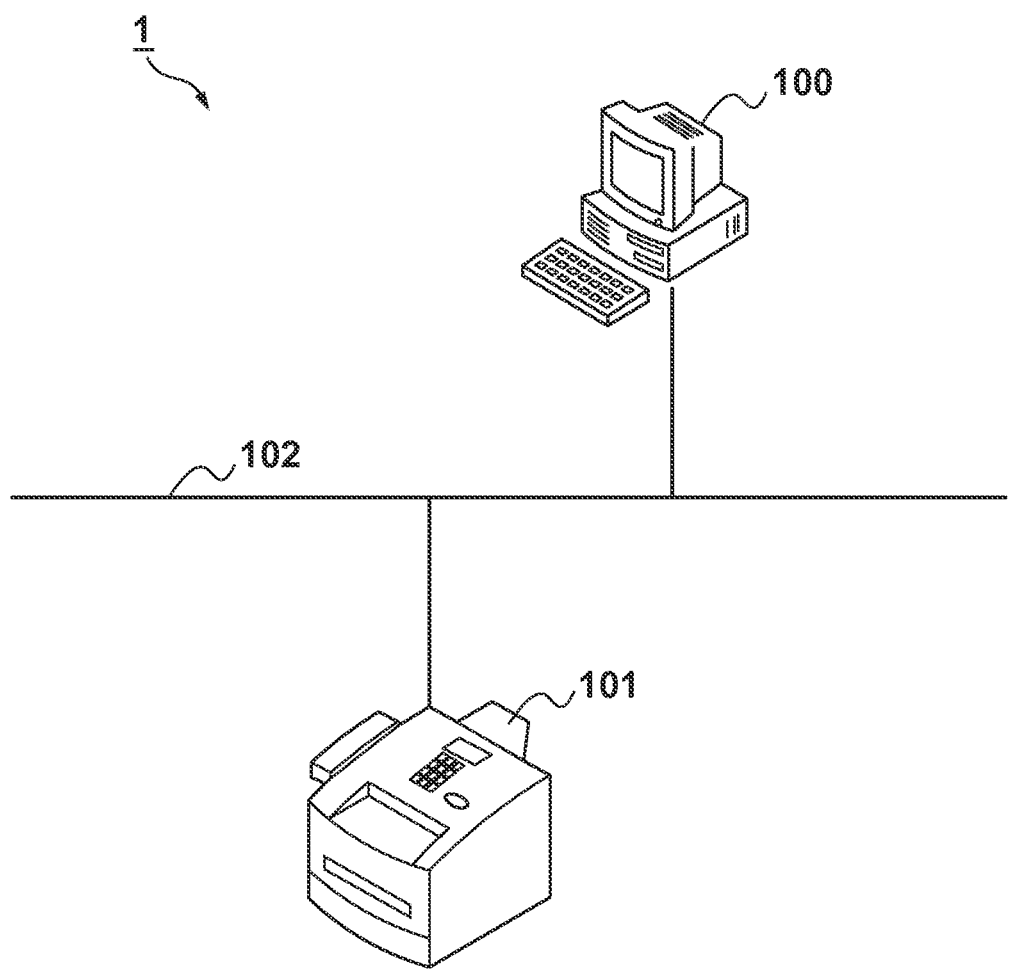
FIG. 1 is a view for showing a configuration of a printing system (image forming system) according to a first embodiment of the present invention.

FIG. 1 is a view for showing a configuration of a printing system (image forming system) according to a first embodiment of the present invention.

Here, a host computer (information processing apparatus) 100 and an image forming apparatus (printer) 101 are connected via a network 102. In this printing system 1, the host computer 100 and the printer 101 communicate bi-directionally via the network 102. Note, the network 102 may be a wired network such as a LAN or USB, or may be a wireless network such as a wireless LAN.

Figure 2:
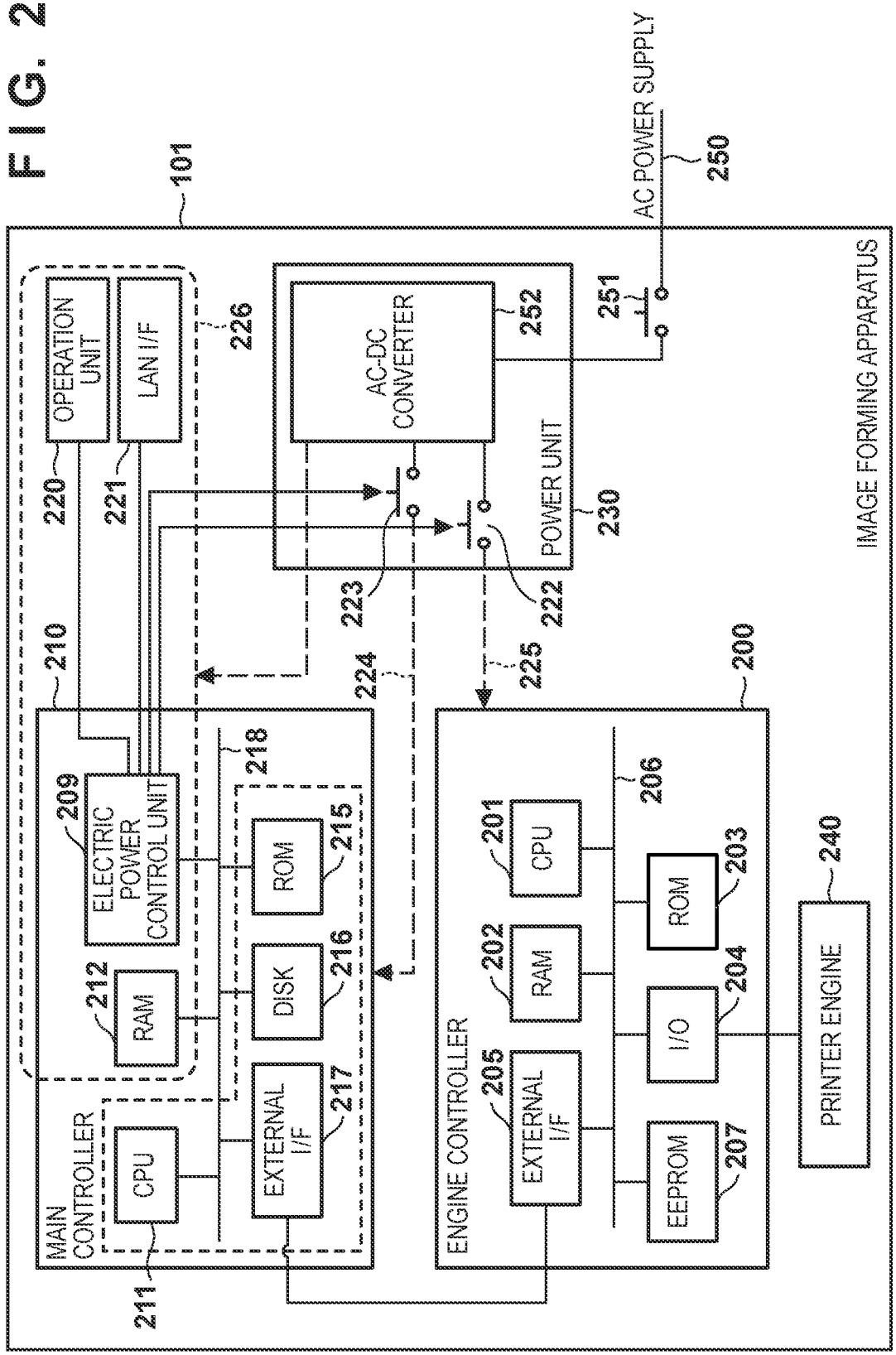
FIG. 2 is a block diagram for explaining a hardware configuration of an image forming apparatus according to the first embodiment.

FIG. 2 is a block diagram for explaining a hardware configuration of the image forming apparatus 101 according to the first embodiment.

The image forming apparatus 101 comprises such things as a main controller 210, an engine controller 200, and a printer engine (image forming mechanism) 240. The main controller 210 manages such things as state transition of the image forming apparatus 101, is capable of communicating with the engine controller 200 and controls operation of the image forming apparatus 101 on the whole. A CPU 211 executes various control processing such as reading control and transmission control in accordance with a control program stored in a ROM 215. A RAM 212 is used as a temporary storage area such as a main memory or a work memory of the CPU 211. A DISK (hard disk) 216 stores image data, various programs, and various setting information in a non-volatile manner. An external I/F 217 is an external interface for performing communication with the engine controller 200. An electric power control unit 209 controls the turning on and off of switches 222 and 223, and controls electric power supply to the main controller 210 and the engine controller 200. The CPU 211 and above described components are connected via a bus 218 for transferring control signals and data.

An operation unit 220 is equipped with a touch panel, has a display unit, keys and the like, and provides an interface function to a user. A LAN I/F 221 controls an interface between the image forming apparatus 101 and the network 102.

The engine controller 200 is a controller for controlling the printer engine 240. The engine controller 200 controls the printer engine 240 in accordance with instructions from the main controller 210 and sends in notification various information of the printer engine 240 to the main controller 210. A CPU 201 executes various control processing such as reading control and transmission control in accordance with a control program stored in a ROM 203. A RAM 202 is used as a temporary storage area such as a main memory or a work memory or the CPU 201. An I/O 204 is an input and output interface for performing communication with the printer engine 240. An external I/F 205 is an external interface for performing communication with the main controller 210. The CPU 201 and above described components are connected via a bus 206 for transferring control signals and data. An EEPROM 207 is used for storing such things as degeneracy information (explained later) in a non-volatile manner.

The printer engine 240 is a part that handles image forming of the image forming apparatus 101 controlled by the engine controller 200, and is equipped with a photosensitive drum, a transfer drum, a fixing unit, paper feed/discharge units, and various sensors (not shown).

A power unit 230 supplies electric power to each unit in the image forming apparatus 101. When the image forming apparatus 101 is powered off, an AC power supply 250 is disconnected by a power switch 251. By turning on the power switch 251, AC power supply is supplied to the AC-DC converter 252 and DC voltage is output. Two independent types of electric power control are possible with instructions of the CPU 211 in the image forming apparatus 101. Specifically, by the electric power control unit 209 turning off the switch 233, an electric power supply 224 to the main controller 210 can be stopped. This corresponds to a case of a sleep mode, for example. Also, by turning off the switch 222, an electric power supply 225 to the engine controller 200 and the printer engine 240 can be stopped. In this way, by the electric power control unit 209 turning on and off the switches 222 and 223, electric power can be supplied as necessary to locations in the image forming apparatus 101 and electric power supply can be stopped.

Note, numeral 226 denotes locations to which electric power is supplied in the sleep mode; even in sleep mode, electric power supply to the electric power control unit 209, the RAM 212, the operation unit 220 and the LAN I/F 221 is continued. Electric power supply to the electric power supply locations 226 is always maintained in any power saving mode.

Below are details of each power state in the power saving mode.

(A) Sleep Mode

The sleep mode is a state in which the electric power consumption of the image forming apparatus 101 is reduced as much as possible. Peripheral devices of the CPU 211 are put into a general suspend state (such as ACPI-S3), only the electric power supply locations 226 are powered, and electric power consumption of the image forming apparatus 101 on the whole can be reduced dramatically. Specifically, the CPU 211 saves a state of the image forming apparatus 101 to the DISK 216 or in backup RAM, turns off the switch 233, and stops the electric power supply to the main controller 210 including the CPU 211. In this state, the CPU 211 itself stops operating, but the electric power control unit 209 can process an interrupt signal due to an input from the operation unit 220 or the LAN I/F 221. Then, for example, upon network reception from the LAN I/F 221 or operation on the operation unit 220, the electric power control unit 209 detects the interrupt signal, the switch 233 is turned on, and electric power supply to the main controller 210 is initiated. With this, the CPU 211 reads out the state of the image forming apparatus 101 stored in the DISK 216 or the backup RAM, performs resetting, and transitions to a standby state, having returned to the state immediately before the power of the main controller 210 was turned off. In the sleep mode, because not many hardware components can operate, the only function is to transition to the standby state. An input job is received, after transitioning to the standby state.

(B) Standby State

A state in which the main controller 210 is being powered. In this state, operation by an operator is received from the operation unit 220, and jobs, and the like, are received from the LAN I/F 221 via the network 102.

When the initiation of a job is instructed, the job is executed after the CPU 211 initiates electric power supply to the engine controller 200 by turning on the switch 222 because the engine controller 200 is powered off. It is possible to reduce standby power consumption in the standby state by stopping electric power supply to the engine controller 200 and the printer engine 240 and only power necessary devices when the job completes.

In the image forming apparatus 101 having the above configuration, for example, an instruction to return from the sleep mode is input from the operation unit 220, for example. With this, firstly, the main controller 210 and the engine controller 200 execute start-up operations of such kinds of initialization as initial setting of each of the CPUs and memory checking.

Next, the engine controller 200 initiates control of the printer engine 240 which is under its control. At this time, generally, state transition information of the image forming apparatus 101 is detected by the main controller 210, and based on the detected information, the engine controller 200 performs control on each driving target. The state transition information is information indicating whether, for example, an activation is due to the power being turned on or due to returning from the sleep mode, and how to transition to the next state.

In contrast to this, in the image forming apparatus 101 according to the first embodiment, by the configuration of a function to be explained next, the engine controller 200 initiates control of each driving target under its control without waiting for start-up operation of the main controller 210.

Figure 3:
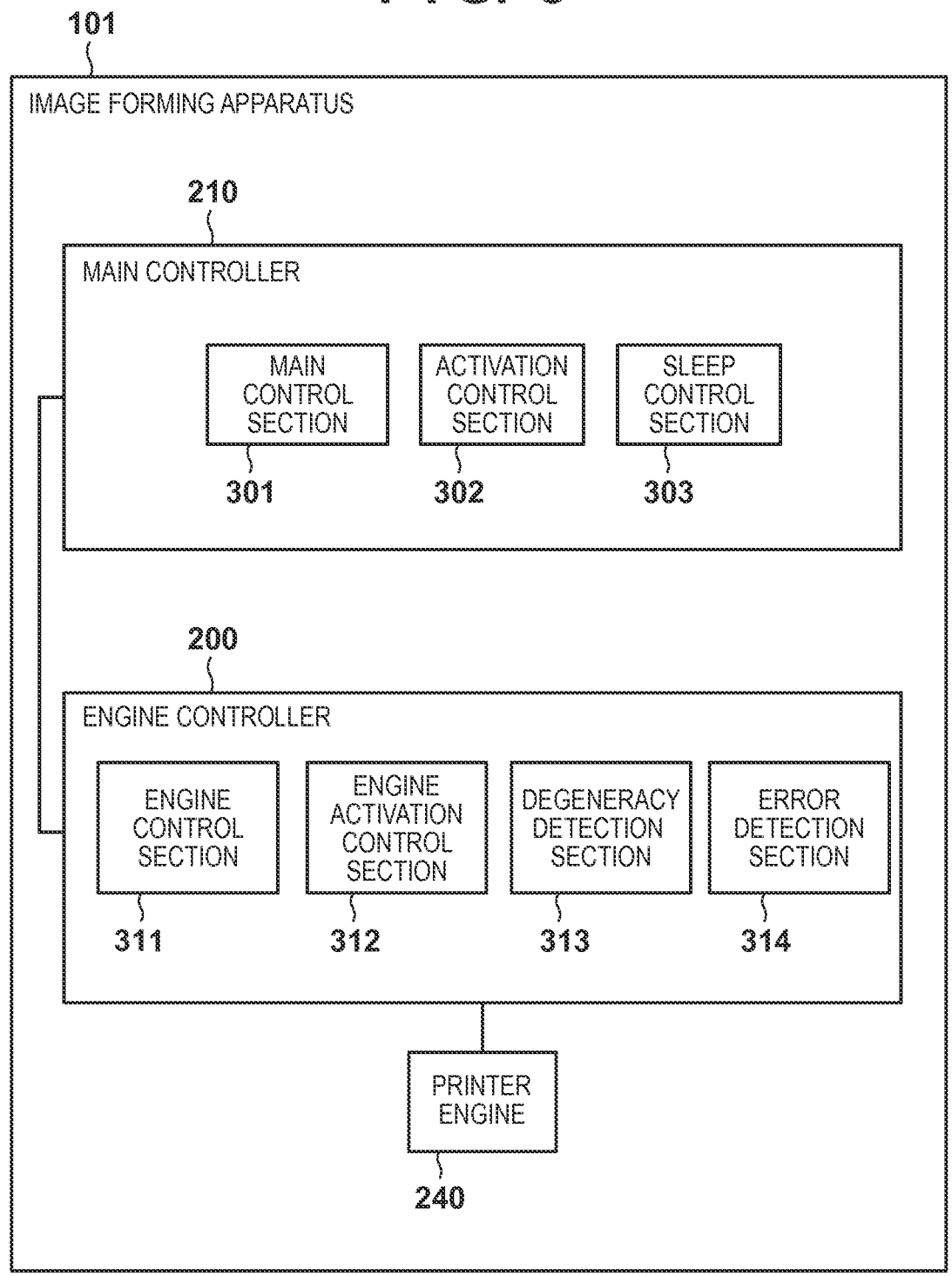
FIG. 3 is a block diagram for explaining a software configuration of a main controller and an engine controller of the image forming apparatus according to the first embodiment.

FIG. 3 is a block diagram for explaining a software configuration of the main controller 210 and the engine controller 200 of the image forming apparatus 101 according to the first embodiment. Note, this software is stored in the ROMs 203 and 215.

Firstly, explanation will be given for the main controller 210.

A main control section 301 of the main controller 210 performs control of the main controller 210 on the whole, and sends instructions to an activation control section 302 and a sleep control section 303. The activation control section 302 performs control of activation of the main controller 210 and the engine controller 200. In a case where a main power of the image forming apparatus 101 is turned off, the activation control section 302 receives an instruction from the main control section 301 and transmits a shutdown request to the engine controller 200. In a case where the main power is turned on, the activation control section 302 receives an instruction from the main control section 301 and turns on the power of the engine controller 200. The sleep control section 303 controls conditions for transition to the sleep mode, and controls whether or not to transition to the sleep mode. Conditions for transition to the sleep mode are set in the image forming apparatus 101 beforehand. In a case where the sleep control section 303 determines that transition to the sleep mode is possible, it notifies the main control section 301 to transition to the sleep mode, and transmits a sleep request to the engine controller 200. Also, in a case of returning from the sleep mode, the main control section 301 makes an instruction to the activation control section 302 to initiate electric power supply to the engine controller 200.

Next, explanation will be given for the engine controller 200. An engine control section 311 of the engine controller 200 performs control of the engine controller 200 on the whole, sends instructions to an engine activation control section 312, and acquires degeneracy information and error detection information from a degeneracy detection section 313 and an error detection section 314 respectively. When the sleep request is sent in notification to the engine controller 200 from the main controller 210, the engine control section 311 outputs an instruction for sleep processing to each controller of the engine controller 200. When the sleep processing ends, the engine controller 200 transitions to the sleep mode. The degeneracy detection section 313 turns on, and stores, to the EEPROM 207, a degeneracy history flag in a case where trouble occurs in a part of the printer engine 240, for example, and a particular function cannot be used.

Figure 4:
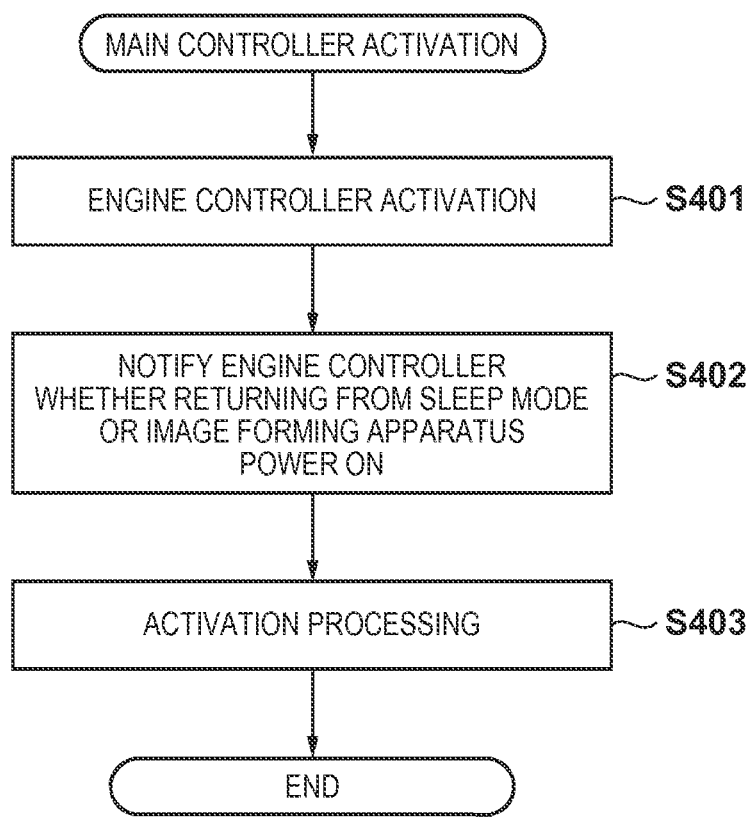
FIG. 4 is a flowchart for describing activation processing in the main controller of the image forming apparatus according to the first embodiment.

FIG. 4 is a flowchart for describing activation processing in the main controller 210 of the image forming apparatus 101 according to the first embodiment. Note, this processing may be realized by storing a program for executing this processing in the ROM 215 and by the CPU 211 reading out and executing this program.

This processing is initiated with the main controller 210 activating, and firstly, in step S401, the CPU 211 activates the engine controller 200 by outputting an activation instruction to the engine control section 311 via the external I/Fs 217 and 205. Next the processing proceeds to step S402, and the CPU 211 determines whether the activation of the engine controller 200 is an activation due to returning from the sleep mode or an activation due to the power of the image forming apparatus 101 being turned on (power switch 251 being turned on). Regarding this determination, the CPU 211, for example, stores the sleep mode in non-volatile memory, and upon being activated due to an interrupt from the operation unit 220 or the LAN I/F 221, it is determined that the activation is due to a return from the sleep mode if the sleep mode is stored. Also, it can be determined whether or not the interrupt is due to the power switch 251 being turned on. The result of this determining is sent in notification to the engine controller 200 via the external I/Fs 217 and 205. Next, the processing proceeds to step S403, and the CPU 211 turns on the switch 222 and activates by initiating electric power supply to the engine controller 200.

Figure 5:
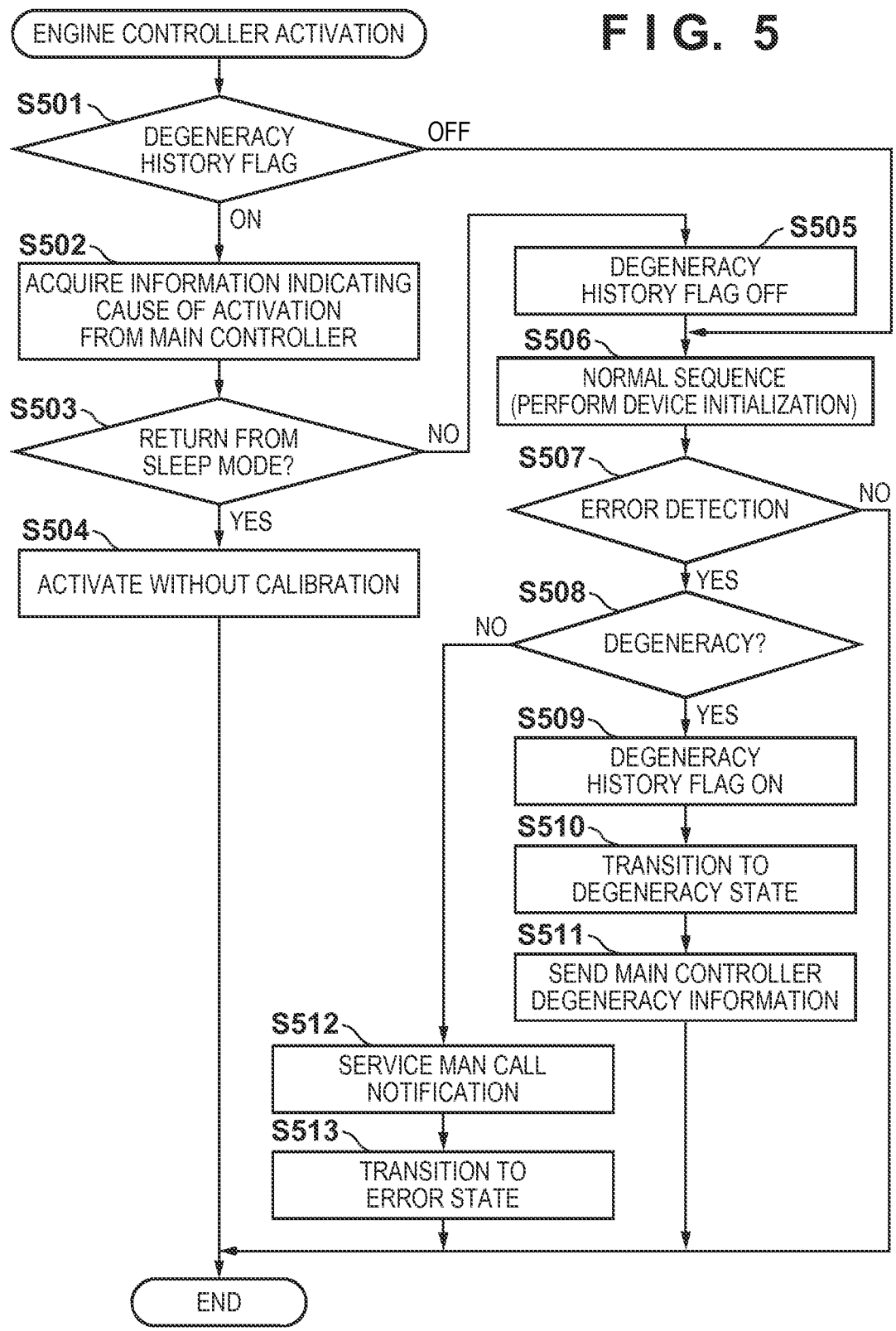
FIG. 5 is a flowchart for describing activation processing in the engine controller of the image forming apparatus according to the first embodiment.

FIG. 5 is a flowchart for describing activation processing in the engine controller 200 of the image forming apparatus 101 according to the first embodiment. Note, this processing may be realized by storing a program for executing this processing in the ROM 203 and by the CPU 201 executing this program.

This processing is initiated upon the engine controller 200 being activated, and firstly, in step S501, the CPU 201 acquires the degeneracy history flag in the EEPROM 207, and determines whether or not the degeneracy history flag is on. Here, if the degeneracy history flag is on, because the degeneracy control state, in which a particular function of the printer engine 240 cannot be used is entered, the processing proceeds to step S502. The degeneracy control is control for operating, in a case where at least one of the parts of the image forming apparatus 101 has a trouble, and at least one function out of a plurality of functions of the image forming apparatus ceases to be usable, to provide functions other than those that cannot be used, i.e. to provide only functions that can be realized and to not use the troubled part or parts. In step S502, the CPU 201 acquires from the main controller 210 information indicating whether the activation is due to a return from the sleep mode or a return due to the power switch 251 being turned on. Then, the processing proceeds to step S503, and it is determined whether or not the activation is due to a return from the sleep mode. If it is due to a return from the sleep mode, the processing proceeds to step S504, and the CPU 201, i.e. the engine activation control section 312, activates the printer engine 240, prohibiting an initialization operation due to calibration (a first activation), and the processing ends.

On the other hand, when, in step S503, it is determined that the activation is not due to a return from the sleep mode, the processing proceeds to step S505, and the CPU 201 turns off (clears) the degeneracy history flag in the EEPROM 207. Next, the processing proceeds to step S506 and the CPU 201, i.e. the engine activation control section 312, makes a calibration instruction to the printer engine 240. Also, in step S501, in a case where the degeneracy history flag is off, the processing proceeds to step S506 and the engine activation control section 312 makes a calibration instruction to the printer engine 240 (a second activation). Next, the processing proceeds to step S507, and the CPU 201 determines whether or not an error was detected by the error detection section 314, and when an error was detected, the processing proceeds to step S508, but when an error was not detected, the activation processing ends. In step S508, the CPU 201, i.e. the degeneracy detection section 313, detects whether the error is a target of degeneracy control, and in a case where it is a target of degeneracy control, the processing proceeds to step S509, and the CPU 201 turns on the degeneracy history flag in the EEPROM 207. Next, the processing proceeds to step S510, and the CPU 201, i.e. the engine control section 311, transitions the printer engine 240 to the degeneracy control. In the degeneracy control, only functions that can be executed are executed, and functions of the printer engine 240 for which errors were detected are not used. Next, the processing proceeds to step S511, the degeneracy information is sent in notification to the main controller 210, and the processing ends.

On the other hand, in a case where, in step S508, the CPU 201 determined that the error could not be degeneracy controlled, the processing proceeds to step S512, and the error information detected by the CPU 201, i.e. the error detection section 314, is sent in notification to the main controller 210 via the external I/Fs 205 and 217. Here, because the image forming apparatus 101 cannot be used until the error is cancelled, a serviceman must be called. Next, in step S513, the CPU 201 transitions to an error state in which a serviceman call is necessary, and the processing ends.

As explained above, by the first embodiment, the engine controller 200 returns from the sleep mode without activating the printer engine 240 in a case of a return from the sleep mode in a degeneracy state. With this, there is an effect that damage of the printer engine due to performance calibration of the printer engine upon activation can be prevented. Also, because there is a high possibility that the degeneracy control will be cancelled in a case of activation due to the power switch of the image forming apparatus 101 being turned on, calibration of the printer engine is performed upon activation. As a result, upon return from the sleep mode, when there is no possibility that the degeneracy is cancelled, calibration of the printer engine can be restricted. Also, upon activation due to power activation for which there is a high possibility that the degeneracy control is cancelled, calibration of the printer engine can be performed.

[Second Embodiment]

Next, explanation will be given for the second embodiment of the present invention. Because the hardware configuration of the image forming apparatus 101 according to the second embodiment is the same as configuration in FIG. 2 according to the previously described first embodiment, its explanation will be omitted. In the second embodiment, the main controller receives a notification of presence or absence of degeneracy from the engine controller, and stores the degeneracy information in a non-volatile manner. Next, in a case where the main controller checks the degeneracy information upon a return from the sleep mode and determines that there is degeneracy control, a return from sleep mode is made in a state in which initialization processing of the printer engine is not allowed to be executed, without turning on the power of the engine controller.

In the second embodiment, if degeneracy control is being executed when transition to the power saving mode is made, upon return from the power saving mode (sleep mode), return processing from the power saving mode is performed without activating the engine controller. Also, the second embodiment is characterized in that if the degeneracy control is cancelled upon activation, normal activation processing is performed for activating the engine controller.

Below, explanation will be given for power states in the power saving mode in the second embodiment.

(A) Sleep Mode

The sleep mode (power saving mode) is a state in which the electric power consumption of the image forming apparatus 101 is reduced as much as possible, as in the case of the first embodiment. Peripheral devices of the CPU 211 are put into a general suspend state (such as ACPI-S3), only parts capable of detecting a job (the electric power supply locations 226) are powered, and electric power consumption of the image forming apparatus 101 on the whole is reduced dramatically. Specifically, the CPU 211 saves a state of the image forming apparatus 101 to the DISK 216 or in backup RAM, turns off the switch 233, and stops the electric power supply to the main controller 210. Here the CPU 211 itself stops operating, but when the electric power supply locations 226 receive a job, an interrupt to the CPU 211 is caused to occur, and the power of the main controller 210 is turned on. With this, the CPU 211 reads out the state of the image forming apparatus 101 stored in the DISK 216 or the backup RAM, performs resetting, and transitions to a standby state, having returned to the state immediately before the power of the main controller 210 was turned off. In the sleep mode, because not many hardware components can operate, the only function is to transition to the standby state. A job is received, after transitioning to the standby state.

(B) Standby State

This is a state in which the main controller 210 is being powered. In this state, operation by an operator is received from the operation unit 220, and jobs, and the like, are received from the LAN I/F 221 via the network 102. Because the electric power supply to the engine controller 200 is turned off, the CPU 211 executes jobs after powering the engine controller 200 by turning on the switch 222. It is possible to reduce standby power consumption in the standby state by stopping electric power supply to the engine controller 200 and the printer engine 240 when the job completes by turning off the switch 222, and only powering necessary devices.

In the image forming apparatus 101 having the above configuration, for example, an instruction to return from the sleep mode is input from the operation unit 220, for example. With this, firstly, the main controller 210 and the engine controller 200 execute start-up operations of such kinds of initialization as initial setting of each of the CPUs and memory checking.

Next, the engine controller 200 initiates control of the printer engine 240 which is under its control. At this time, generally, state transition information of the image forming apparatus 101 is detected by the main controller 210, and based on the detected information, the engine controller 200 performs control on each driving target. The state transition information is information indicating whether, for example, an activation is due to the power being turned on or due to returning from the sleep mode, and how to transition to the next state.

In contrast to this, in the image forming apparatus 101 according to the second embodiment, by the configuration of a function to be explained next, the engine controller 200 initiates control of each driving target under its control without waiting for start-up operation of the main controller 210.

The software configuration of the main controller 210, the engine controller 200 and the software configuration of the image forming apparatus 101 according to the second embodiment are common to FIG. 3 according to the previously described first embodiment, and so explanation will be omitted.

In the image forming apparatus 101 according to the second embodiment, the engine controller 200 initiates control of the driving target (the printer engine 240) without waiting for the start-up operation of the main controller 210 to end.

Figure 6:
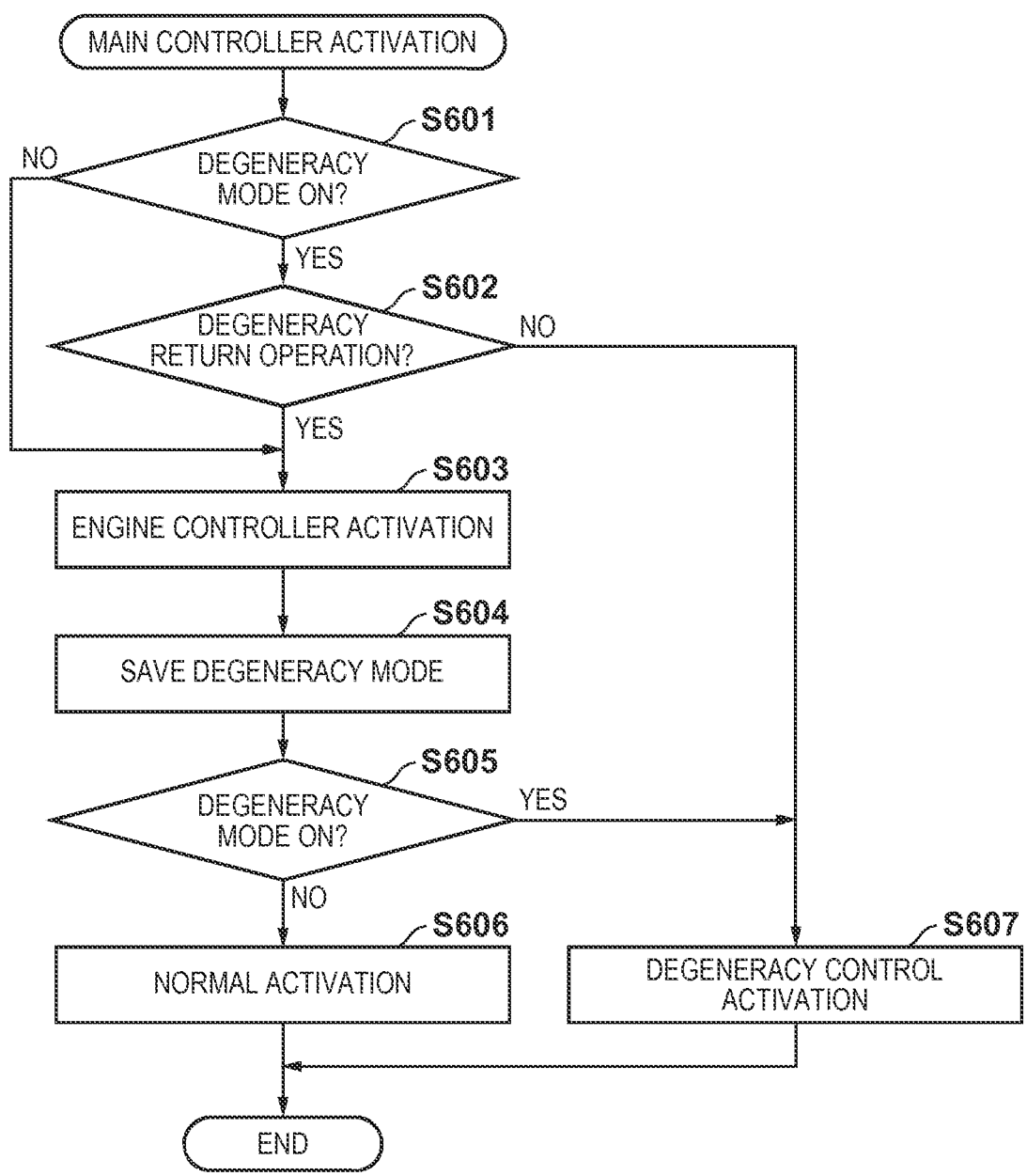
FIG. 6 is a flowchart for describing activation processing in the main controller of the image forming apparatus according to a second embodiment in a case where a power is activated.

FIG. 6 is a flowchart for describing activation processing in the main controller 210 of the image forming apparatus 101 according to the second embodiment in a case where a power is activated. Note, processing illustrated by this flowchart is realized by the CPU 211 executing a program stored in the ROM 215.

Firstly, in step S601, the CPU 211 acquires a value (hereinafter referred to as a degeneracy mode) saved in the DISK 216 indicating whether or not the engine controller 200 was performing degeneracy control. Here, in a case where the degeneracy mode is on, i.e. where the degeneracy control was performed, the processing proceeds to step S602, and the presence or absence of the degeneracy return operation is determined. On the other hand, in a case where the degeneracy mode is off, i.e. the engine controller 200 was not performing degeneracy control, the processing proceeds to step S603 because normal activation processing will be continued. In step S602, the CPU 211 determines whether or not an operation for returning from the degeneracy control (degeneracy return operation) is performed. The degeneracy return operation is an operation such as an operation to return from an error by, for example, a serviceman, or a part replacement performed when the power of the image forming apparatus 101 is turned off in order to process an error that caused degeneracy control to be performed. Whether or not this degeneracy return operation was performed is determined based on whether or not the main controller 210 was instructed that the serviceman that performed the operation to return from the error, for example, performed a degeneracy return check via the operation unit 220 upon the power activation of the image forming apparatus 101. In step S602, when the CPU 211 determines that the degeneracy return operation was performed, the processing proceeds to step S603; otherwise, because processing such as operation for return from error or part replacement is not finished, the processing proceeds to step S607 and activation is performed in accordance with the degeneracy control.

In step S603, the CPU 211 initiates electric power supply to the engine controller 200 by turning on the switch 222, and activates the engine controller 200 and the printer engine 240.

Next, the processing proceeds to step S604, and the CPU 211 activates the engine controller 200, and receives a degeneracy detection result from the engine controller 200 by performing initialization processing. When the engine controller 200 executes initialization (calibration) of the printer engine 240, and detects a problem in the printer engine 240, the engine controller 200 determines whether or not the problem is one for which degeneracy control is possible. If degeneracy control can be performed, the degeneracy mode is turned on, and saved to the DISK 216. Here, when no problem in the printer engine 240 is detected, the degeneracy mode is turned off and saved to the DISK 216. Note, at this time, if the error is such that repairs by a serviceman are necessary, configuration may be taken such that something to that effect is saved to the DISK 216, and activation processing is not executed thereafter.

Next, the processing proceeds to step S605, and the CPU 211 determines whether or not the degeneracy mode is on by reading out the value of the degeneracy mode saved in the DISK 216. Here, when it is determined that the degeneracy mode is on, the processing proceeds to step S607, and when it is determined that the degeneracy mode is off, the processing proceeds to step S606. In step S606, because the printer engine 240 is in a state in which it is possible to activate normally, the CPU 211 causes activation of the main controller 210 to complete by performing normal activation, and the processing ends.

On the other hand, in step S607, the CPU 211 performs activation with the degeneracy mode on, and the processing completes. In activation when the degeneracy mode is on, the CPU 211 leaves the switch 222 turned off, and electric power supply to the engine controller 200 stopped. Here, the CPU 211 cannot perform communication with the engine controller 200, but performs activation processing based on information of the engine controller 200 and the printer engine 240 saved to the DISK 216 upon the previous activation.

By the above processing, activation processing can be changed in accordance with whether an error occurred in the printer engine 240 and degeneracy control is being performed, or whether the degeneracy control is cancelled, upon activation of the main controller 210 due to the power of the image forming apparatus 101 being turned on. In this way, even if the activation is due to the power of the image forming apparatus being turned on, it is determined whether or not the degeneracy mode is on, and activation control of the printer engine can be performed in accordance with the determination result.

Figure 7:
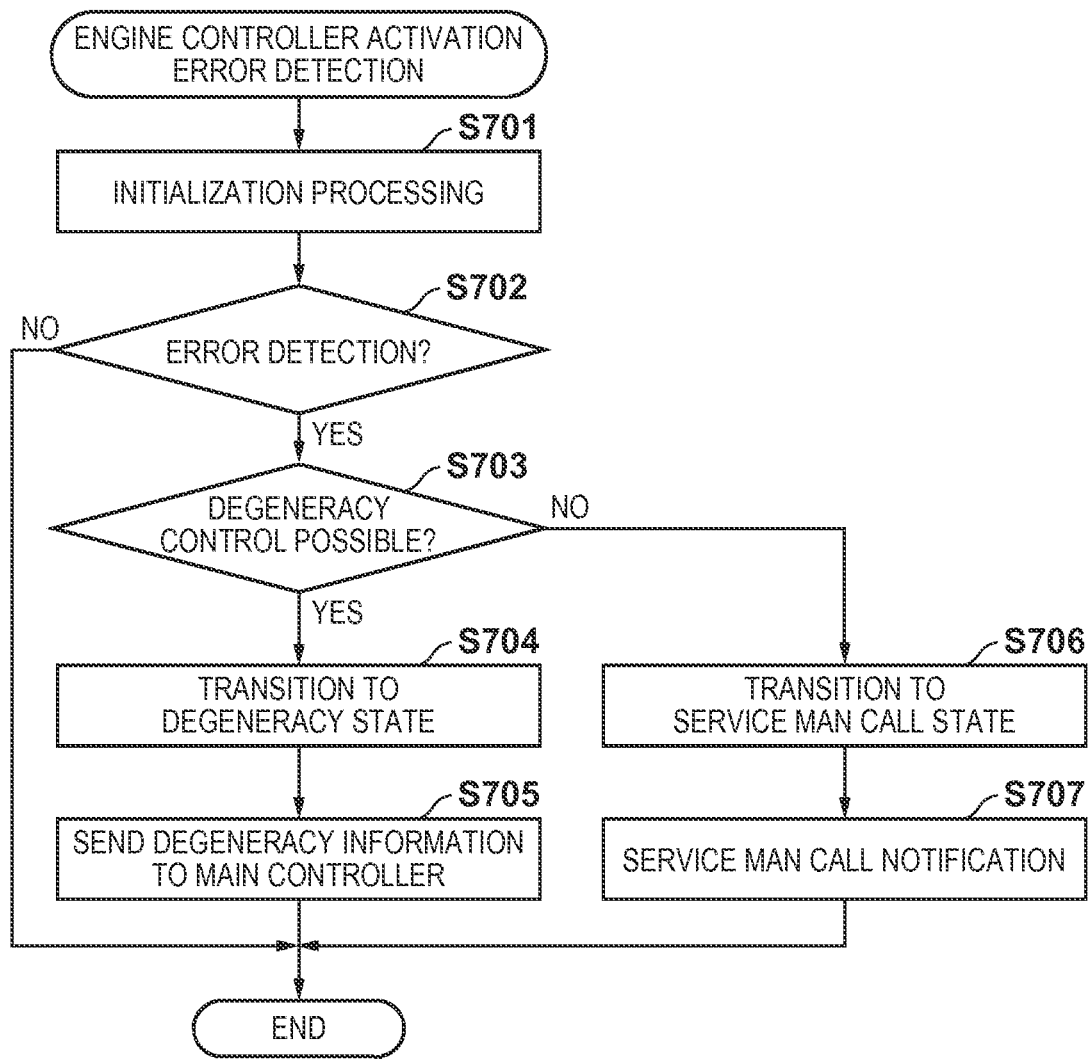
FIG. 7 is a flowchart for describing activation processing in the engine controller of the image forming apparatus according to the second embodiment.

FIG. 7 is a flowchart for describing activation processing in the engine controller 200 of the image forming apparatus 101 according to the second embodiment due to the power being turned on. Note, this processing is realized by the CPU 201 executing a program stored in the ROM 203.

Firstly, in step S701, the CPU 201 performs initialization processing of the hardware of the image forming apparatus 101 and the printer engine 240. Here, the CPU 201 performs initialization processing of such things as a fixing heater and a fixing roller of the printer engine 240, various sensors and driving units. Next, the processing proceeds to step S702, the CPU 201 determines the existence or absence of an error detected in the initialization processing of step S701; if there is an error, the processing proceeds to step S703, and if there is no error, the processing ends.

In step S703, the CPU 201 determines whether or not the error detected in step S702 is a target of the degeneracy control. In a case where it is determined that the error is a target of degeneracy control, the processing proceeds to step S704; because in a case where the error is determined not to be a target of the degeneracy control the activation processing cannot continue, a serviceman call state is transitioned into and the processing proceeds to step S706. In step S706, the CPU 201 transitions the status of the engine controller 200 into the serviceman call state. Here, the serviceman call state is a state in which until repairs are performed by a serviceman, the functions of the image forming apparatus 101 cannot be used. Next, the processing proceeds to step S707, and the CPU 201 sends notification that the serviceman call state has been entered, based on the error detected in step S702, and displays the error to the operation unit 220, and the processing ends.

On the other hand, in step S704, the CPU 201 transitions the status of the engine controller 200 into the degeneracy state. Next, the processing proceeds to step S705, and the CPU 201 sends notification to the main controller 210 that the engine controller 200 and the printer engine 240 are transitioning to the degeneracy state, based on the error detected in step S702, and the processing ends.

As explained above, the engine controller 200 initiates activation processing in accordance with an instruction of the main controller 210. When the printer engine error is detected upon activation due to the power being turned on, in accordance with the content of the error, either the degeneracy state is transitioned into, or the serviceman call state is transitioned into, and that result is sent in notification to the main controller 210.

Also, degeneracy control activation, or the serviceman call status or normal activation can be performed independently of whether the engine controller 200 instructed a return from the power saving mode state, or whether power activation of the image forming apparatus 101 was performed.

Figure 8:
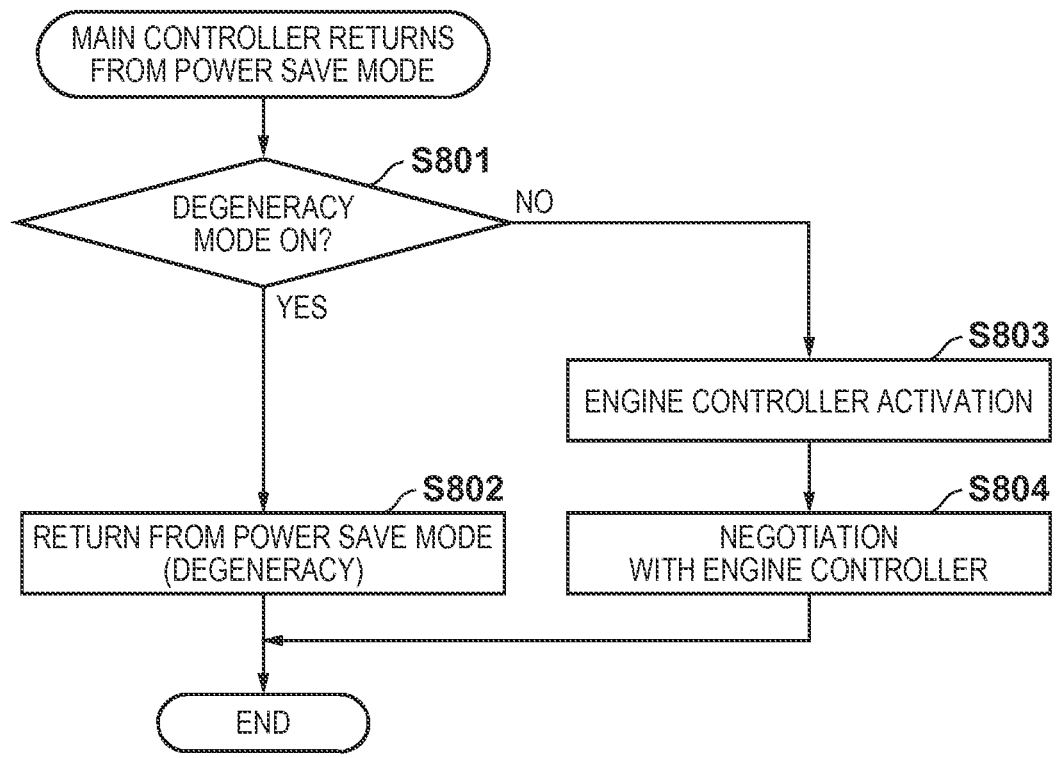
FIG. 8 is a flowchart for describing processing in the image forming apparatus according to the second embodiment in a case of returning from the power saving mode.

FIG. 8 is a flowchart for describing processing in a case where the main controller 210 of the image forming apparatus 101 according to the second embodiment returns from the power saving mode. Note, this processing is realized by the CPU 211 executing a program stored in the ROM 215.

Firstly, in step S801, the CPU 211 determines the value (ON/OFF) of the degeneracy mode saved in the DISK 216. Here, in a case where the degeneracy mode is on, the processing proceeds to step S802, and in a case where the degeneracy mode is off, the processing proceeds to step S803. In step S802, the CPU 211 performs return processing in the power saving mode when in degeneracy. In the return processing in the power saving mode when in degeneracy, the CPU 211 completes the return processing from the power saving mode without turning on the switch 222 and performing negotiation with the engine controller 200.

On the other hand, in step S803, the CPU 211 activates by turning on the switch 222 and initiating powering of the engine controller 200. With this, the engine controller 200 executes error detection processing shown in FIG. 7 upon the engine controller activation, and performs processing in accordance with the detection result. Next, the processing proceeds to step S804, and the CPU 211 acquires results of calibration of the engine controller 200 and the printer engine 240, and detection results of the various sensors, performs collaborative operation, and completes return processing from the power saving mode.

As explained above, by the image forming apparatus according to the second embodiment, it is determined whether or not the degeneracy mode is on (degeneracy control was being executed) upon activation, and in a case where the degeneracy mode is on, return processing can be performed without activating the engine controller 200.

Also, in a case where the degeneracy mode is on, it is determined whether or not operation to return from the error was performed, and it is possible that the engine controller 200 only be activated in a case where the return operation was performed. As a result, it is possible to restrict unnecessary calibration of the printer engine 240.

[Third Embodiment]

Next, explanation will be given for the third embodiment of the present invention. Note, because the hardware configuration of the image forming apparatus 101 according to the third embodiment is the same as configuration in FIG. 2 according to the previously described first embodiment, its explanation will be omitted.

The software configuration of the main controller 210 and the engine controller 200 of the image forming apparatus 101 according to a third embodiment is common to FIG. 3 according to the previously described first embodiment, and so explanation will be omitted.

The engine control section 311 of the engine controller 200 controls the engine controller 200 on the whole. The engine control section 311 gives instructions to the engine activation control section 312, and acquires information from the degeneracy detection section 313. In a case where a shutdown request is sent in notification from the main controller 210 to the engine controller 200, the engine control section 311 makes an instruction for finishing processing to each controller of the engine controller 200. The engine control section 311 makes a notification to the main controller 210 of shutdown preparation completion when finishing processing of each controller completes. In a case where power is activated for the engine controller 200 by control of the main controller 210, the engine control section 311 makes an instruction for initialization to the engine activation control section 312. The engine activation control section 312 receives this instruction, makes a calibration instruction to the printer engine 240, and makes an initialization instruction to other controllers in the engine controller 200. In this case, the engine activation control section 312 checks a status of a physical signal line (hereinafter referred to as LIVEWAKE signal line) between the main controller 210 and the engine controller 200. In a case where the LIVEWAKE signal line is on, only initialization of the engine controller 200 is performed without performing initialization of the printer engine 240; in a case where it is off, control is made so that the printer engine 240 and the engine controller 200 are initialized. The degeneracy detection section 313 receives information from the printer engine 240 that an error occurred due to trouble in a part, and sends in notification that information as degeneracy information to the main controller 210.

Figure 9:
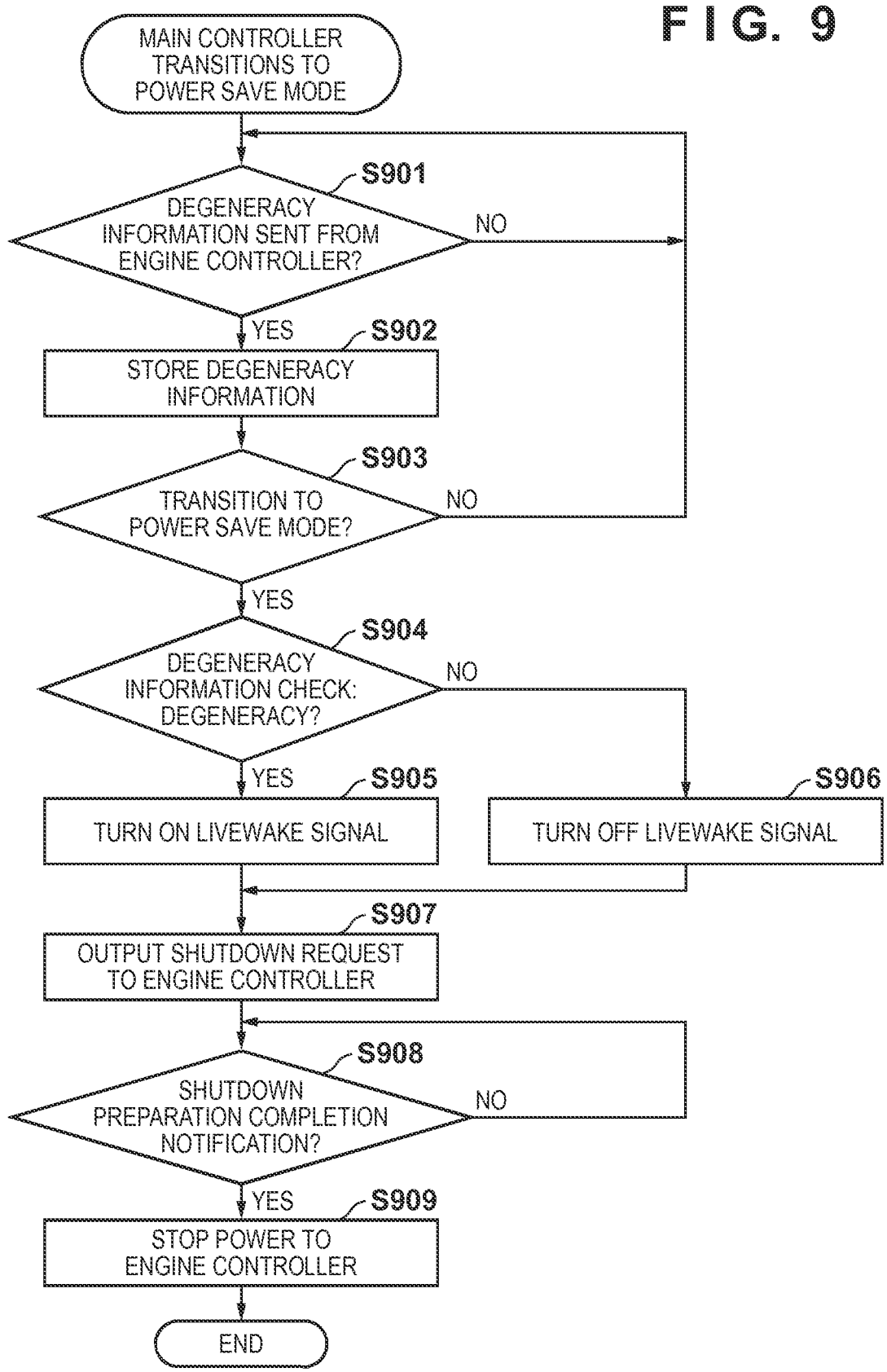
FIG. 9 is a flowchart for describing processing in the main controller in a case where the image forming apparatus according to a third embodiment transitions to the power saving mode.

FIG. 9 is a flowchart for describing processing in the main controller 210 in a case where the image forming apparatus 101 according to a third embodiment transitions to the power saving mode. Note, this processing is realized by the CPU 211 executing a program stored in the ROM 215.

Firstly, in step S901, the CPU 211 determines whether or not degeneracy information is sent in notification from the engine controller 200, and if the degeneracy information is sent in notification, the processing proceeds to step S902, the degeneracy information is retained in a back up RAM or the DISK 216. Next, the processing proceeds to step S903, and the CPU 211 determines whether or not a transition condition for the image forming apparatus 101 to transition to the power saving mode is satisfied, and in a case where it is determined that the transition condition is satisfied, the processing proceeds to step S904. In step S904, upon transition to the power saving mode, the degeneracy information stored in step S902 is acquired, and it is determined whether or not the degeneracy state is entered. Here, in a case where it is determined that the degeneracy state is entered, the processing proceeds to step S905, and the CPU 211 outputs an on signal to the LIVEWAKE signal line.

On the other hand, in step S904, in a case where it is determined that the degeneracy state is not entered, the processing proceeds to step S906, and the CPU 211 outputs an off signal to the LIVEWAKE signal line. After executing either step S905 or step S906 in this way, the processing proceeds to step S907, and the CPU 211 transmits a shutdown request to the engine controller 200 via the external I/F 217. Next, the processing proceeds to step S908, the CPU 211 waits to be notified of the shutdown preparation completion by the engine controller 200, and when the shutdown preparation completion notification is received, the processing proceeds to step S909. In step S909, the CPU 211 stops electric power supply to the engine controller 200 by turning off the switch 222.

By the third embodiment, the main controller 210 stores degeneracy information from the engine controller 200. Next, upon transition into the power saving mode, a signal for controlling initialization upon return of the printer engine 240 and the engine controller 200 is output.

Figure 10:
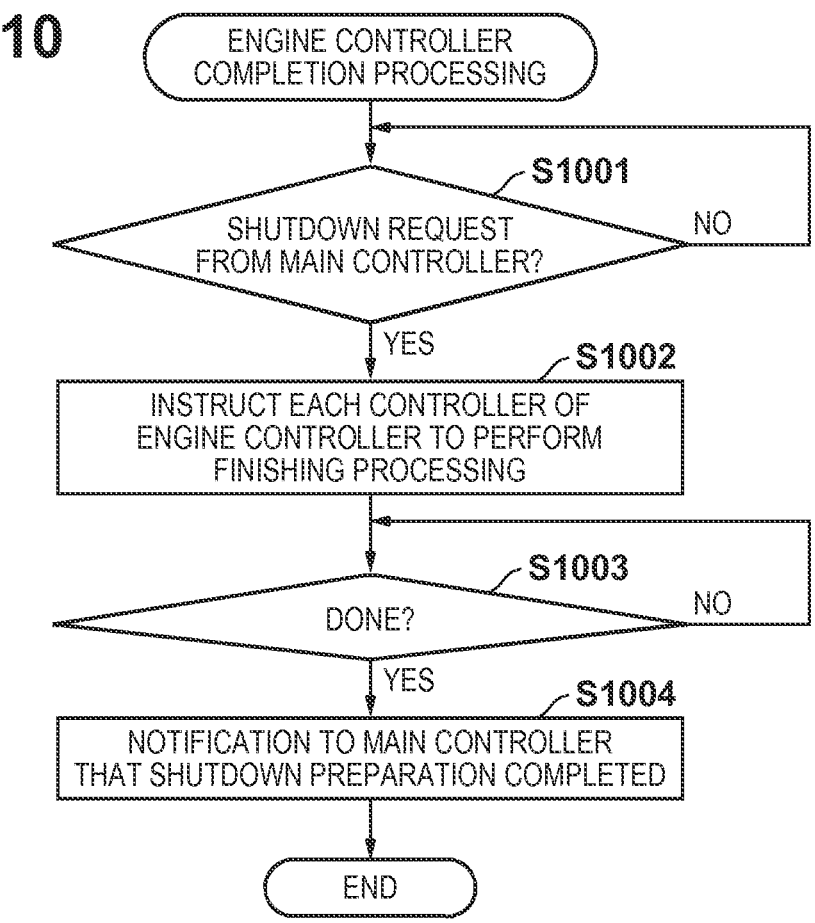
FIG. 10 is a flowchart for describing shutdown processing by the engine controller of the image forming apparatus according to the third embodiment.

FIG. 10 is a flowchart for describing shutdown processing by the engine controller 200 of the image forming apparatus 101 according to the third embodiment. Note, this processing is realized by the CPU 201 executing a program stored in the ROM 203.

Firstly, in step S1001, the CPU 201 determines whether or not the shutdown request is sent in notification from the main controller 210 via the external I/F 205. When the shutdown request has be sent in notification, the processing proceeds to step S1002, and the CPU 201 makes a request for finishing processing to each controller of the engine controller 200. Then in step S1003, when the finishing processing of all of the control units completes, the processing proceeds to step S1004, and the CPU 201 makes a notification to the main controller 210 that the shutdown preparation completed.

Figure 11:
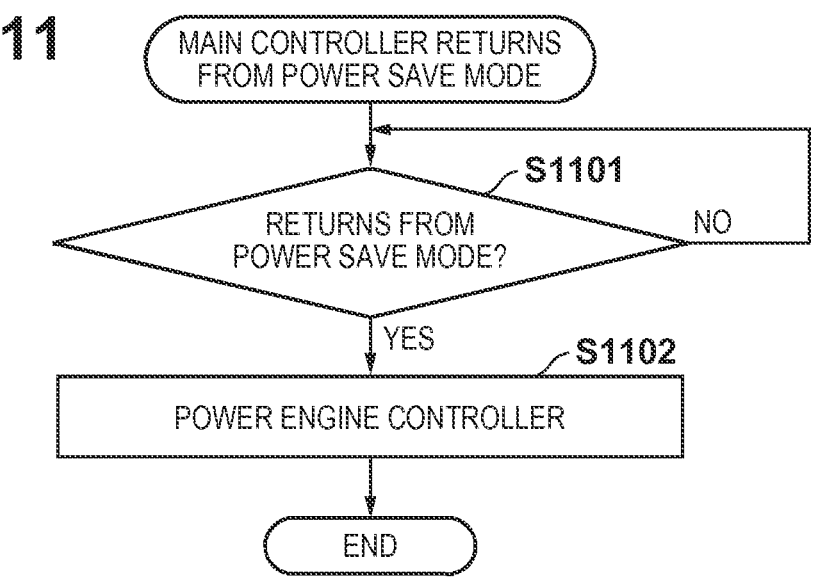
FIG. 11 is a flowchart for describing processing in a case where the main controller of the image forming apparatus according to the third embodiment returns from the power saving mode.

FIG. 11 is a flowchart for describing processing in a case where the main controller 210 of the image forming apparatus 101 according to the third embodiment returns from the power saving mode. Note, this processing is realized by the CPU 211 executing a program stored in the ROM 215.

Firstly, in step S1101, the CPU 211 instructs initiation of the activation processing upon receipt of a print job instruction from the operation unit 220 and the LAN I/F 221. Next, the processing proceeds to step S1102, and the CPU 201 activates the power of the engine controller 200.

FIG. 12 is a flowchart for describing processing in a case where the engine controller 200 of the image forming apparatus 101 according to the third embodiment returns from the power saving mode. Note, this processing is realized by the CPU 201 executing a program stored in the ROM 203.

This processing is initiated by the power of the engine controller 200 being activated, and firstly, in step S1201, the CPU 201 checks whether the LIVEWAKE signal line is on or off. In a case where the LIVEWAKE signal line is off, the processing proceeds to step S1203; in a case where the LIVEWAKE signal line is on, the processing proceeds to step S1202. In step S1202, because the degeneracy state is entered, the CPU 201 performs only initialization of the engine controller 200 without executing initialization processing of the printer engine 240, and the processing ends.

On the other hand, in step S1203, because the degeneracy state is not entered, the CPU 201 instructs initialization to each of the controllers of the engine controller 200 and to the printer engine 240. Next, the processing proceeds to step S1204, the CPU 201 determines whether or not an error occurred during the initialization of the printer engine 240, and when no error occurred, the processing ends. On the other hand, when an error occurred, the processing proceeds to step S1205, and the CPU 201 determines whether or not the error sent in notification is an error due to one or more parts of the printer engine 240 being troubled, and whether the error is one for which the degeneracy control is possible. In a case where it is determined that it is an error for which the degeneracy control is possible, the processing proceeds to step S1206, and the CPU 201 sends in notification to the main controller 210 that the error for which degeneracy is possible occurred, and the degeneracy information. Then the processing proceeds to step S1207, and the CPU 201 controls the printer engine 240 in degeneracy.

On the other hand, in a case where, in step S1205, the CPU 201 determines that it is an error for which degeneracy control is not possible, the processing proceeds to step S1208, and the CPU 201 sends in notification to the main controller 210 serviceman call state information. Next, the processing proceeds to step S1209, and the CPU 201 notifies the user that the serviceman call state is entered. The engine controller 200 performs control in the serviceman call state. Here, the serviceman call state is a state in which until repairs are performed by a serviceman, the functions of the image forming apparatus 101 cannot be used.

As explained above, by the third embodiment, in a case where the degeneracy control was being performed by the printer engine before the transition to the power saving mode, initialization of the printer engine (calibration) is not executed upon return from the power saving mode.

Also, by third embodiment, an existing LIVEWAKE sequence can be utilized, and also because LIVEWAKE is set before entering the power saving mode, there is the advantage that upon return from the power saving mode, no special processing by the main controller is necessary.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-281757, filed Dec. 25, 2012, which is hereby incorporated by reference herein in its entirety.

What is claimed is:

1. An image forming apparatus, comprising:
   an image forming unit configured to form an image on a sheet;
   a control unit configured to control operation of the image forming unit; and
   a storage unit configured to store degeneracy information indicating that a function of the image forming unit is restricted due to degeneracy control being performed,
   wherein the control unit:
   (A) stores the degeneracy information into the storage unit based on an error of the image forming unit,
   (B) accesses the storage unit according to activating from a power saving state in which an electronic power supply to the control unit is stopped,
   (C) does not execute an initialization operation of the image forming unit in a case where the storage unit stores the degeneracy information, and
   (D) does execute the initialization operation of the image forming unit in a case where the storage unit does not store the degeneracy information.

2. The image forming apparatus according to claim 1, wherein the control unit further executes the initialization operation of the image forming unit in a case where the storage unit stores the degeneracy information and the image forming apparatus activates from a powered off state.

3. The image forming apparatus according to claim 1, further comprising:
   a transmission unit configured to transmit, to the control unit, information indicating that the image forming apparatus activates from the power saving state,
   wherein the control unit determines whether or not the image forming apparatus activates from the power saving state based on the information transmitted by the transmission unit.

4. The image forming apparatus according to claim 1, wherein the storage unit is a non-volatile storage unit capable of retaining the degeneracy information in the power saving state.

5. The image forming apparatus according to claim 1, wherein the control unit clears the degeneracy information stored in the storage unit in a case where the storage unit stores the degeneracy information and the image forming apparatus activates from a powered off state having lower power usage than the power saving state.

6. The image forming apparatus according to claim 1, further comprising:
   a main power switch,
   wherein, in the power saving state, the main power switch is turned on and the electronic power supply to the control unit is stopped.

7. The image forming apparatus according to claim 6, wherein the control unit is configured to execute the initialization operation of the image forming unit according to activating from a power off state in which the main power switch is turned off and the electronic power supply to the control unit is stopped.

8. The image forming apparatus according to claim 6, wherein the control unit is configured to cancel the degeneracy information according to activating from a power off state in which the main power switch is turned off and the electronic power supply to the control unit is stopped.

9. A method of controlling an image forming apparatus having an image forming unit configured to form an image on a sheet, a control unit configured to control operation of the image forming unit, and a storage unit configured to store degeneracy information indicating that a function of the image forming unit is restricted due to degeneracy control being performed, the method comprising:
   (A) storing the degeneracy information into the storage unit based on an error of the image forming unit,
   (B) accessing the storage unit according to activating from a power saving state in which an electronic power supply to the control unit is stopped,
   (C) not executing an initialization operation of the image forming unit in a case where the storage unit stores the degeneracy information, and
   (D) executing the initialization operation of the image forming unit in a case where the storage unit does not store the degeneracy information.

* * * * *